(12) United States Patent
Miyashita et al.

(10) Patent No.: US 6,967,905 B2
(45) Date of Patent: Nov. 22, 2005

(54) INFORMATION PLAYBACK APPARATUS

(75) Inventors: Masahiko Miyashita, Saitama-ken (JP); Kensuke Chiba, Tokyo (JP); Gen Inoshita, Tokyo (JP); Koji Ogura, Saitama-ken (JP); Harui Koizumi, Saitama-ken (JP); Hiroyasu Eguchi, Saitama-ken (JP); Tetsuhiro Hase, Saitama-ken (JP); Katsuhiko Goda, Saitama-ken (JP); Chihaya Oga, Saitama-ken (JP); Nobuo Ohyama, Saitama-ken (JP)

(73) Assignee: Pioneer Corporation, Tokyo (JP)

( * ) Notice: Subject to any disclaimer, the term of this patent is extended or adjusted under 35 U.S.C. 154(b) by 574 days.

(21) Appl. No.: 10/271,565

(22) Filed: Oct. 17, 2002

(65) Prior Publication Data
US 2003/0076751 A1 Apr. 24, 2003

(30) Foreign Application Priority Data
Oct. 19, 2001 (JP) .............................. 2001-321802

(51) Int. Cl.$^7$ ............................................ G11B 7/085
(52) U.S. Cl. ................ 369/30.11; 369/30.19; 369/30.27; 369/53.34; 84/612
(58) Field of Search .................. 369/30.11, 30.19, 369/30.21, 30.27, 53.34, 47.32, 189, 2, 47.13, 369/30.01, 30.03–30.07, 30.28; 84/612, 462

(56) References Cited

U.S. PATENT DOCUMENTS

| 5,353,275 A | 10/1994 | Almonte ..................... 369/189 |
| 5,375,106 A | 12/1994 | Kawachi et al. ......... 369/30.27 |
| 5,511,053 A | 4/1996 | Jae-Chang ............... 369/53.34 |
| 6,804,179 B2 * | 10/2004 | Miyashita et al. ....... 369/30.23 |
| 6,904,003 B2 * | 6/2005 | Miyashita et al. ....... 369/30.07 |

FOREIGN PATENT DOCUMENTS

GB          2 198 574 A          6/1988

* cited by examiner

Primary Examiner—Ali Neyzari
(74) Attorney, Agent, or Firm—Arent Fox PLLC

(57) ABSTRACT

An information playback apparatus is provided, which can provide a sound which sounds natural by controlling an abrupt change in a tempo in the case of random access playback. When a cue point is registered, audio data which makes seamless playback possible is stored into a cue point memory, and further, the beat density of a playback sound being played when the cue point is registered is measured and stored. When the cue point is specified to start random access playback later, a ratio of the beat density ($\alpha \times DBPM$) of a playback sound being played when the cue point is specified and the beat density (DBPMreg) stored in advance is found. Then, the random access playback is started after the beat density of a playback sound to be played after random access playback is started is corrected to be equal to the beat density when a start of the random access playback is specified.

3 Claims, 8 Drawing Sheets

INFORMATION PLAYBACK APPARATUS

BACKGROUND OF THE INVENTION

The present invention relates to an information playback apparatus for playing back information recorded in an information recording medium, such as a CD (Compact Disc), a DVD (Digital Versatile Disc), and an MD (Mini Disc), and more particularly to an information playback apparatus capable of performing random access playback to start playback from an arbitrary portion.

The present application claims priority from Japanese Application No. 2001-321802, the disclosure of which is incorporated herein by reference for all purposes.

As a conventional information playback apparatus for playing back information recorded in an information recording medium, such as a CD, a DVD, and an MD, there is known a type furnished with a random access playback function.

The random access playback function is a function to start information playback by searching a position called a cue point. For example, when the user or the like registers a recording position (address) of desired information as a cue point in advance and specifies the cue point during playback later, he/she can automatically jump to the position of the cue point from a position currently being played back and start information playback from the jumped position.

Besides the random access playback function, a conventional information playback apparatus may be furnished with an editing function for editing information, such as music, recorded in an information recording medium when it is played back, so that a sound at a tempo different from the original music or the like is played. Hence, when the user or the like plays back information, such as music, by using the editing function, he/she can produce various sound effects.

To be more specific, an information playback apparatus furnished with the random access playback function and the editing function is provided with a disc-like rotatable manipulation member called a jog dial. When the user or the like manipulates the jog dial to rotate at a desired speed, a tempo of a playback sound is changed in response to a rotational speed of the jog dial, whereby sound effects at a tempo different from the original music or the like recorded in a CD, a DVD, etc. can be produced.

In other words, it is known that by forcedly rotating the turntable of an analog record player, on which is placed an analog record, such as an LP, at the number of revolutions (rotational speed) different from the normal number of revolutions while the analog record is being played, the moving speed (running speed) of the stylus moving in the recording grooves of the analog record is changed, thereby producing a sound at a tempo different from the originally played back music or the like. For example, it is known that if an analog record having recorded slow-tempo music is played forcedly at a higher number of revolutions than the normal number of revolutions, music is played as if it were up-tempo music.

The jog dial is provided to the conventional information playback apparatus to attain the same phenomenon as with the analog record player.

The jog dial is provided as an equivalent to the turntable of the analog record player, and when the user or the like changes the rotational speed of the jog dial by hand, he/she can produce the same sound effects produced when forcedly changing the moving speed of the stylus with respect to an analog record, that is, sound effects at a tempo different from the original music or the like.

Further, the user or the like can achieve complicated and sophisticated editing by making full use of the random access playback function and the editing function. He/she can perform editing in various manners by, for example, producing sound effects at different tempos by manipulating the jog dial while a given portion of music is being played, then manipulating the jog dial further while music is being played from a desired portion by the random access playback function, whereby he/she can produce sound effects by playing the desired portion at different tempos.

As has been described, the conventional information playback apparatus furnished with the random access playback function and the editing function is provided with multiple functions, so that it can be used not only as a music player, but also as an electronic musical instrument.

However, the conventional information playback apparatus furnished with the random access playback function and the editing function has a problem that when access is made to a cue point position different from a given portion of music currently being played and playback is continued, a discontinuous sound is played at the beginning of the random access playback.

To be more concrete, as shown in FIG. 8($a$), in a case where music recorded in an information recording medium, such as a CD or a DVD, is composed of a slow-tempo portion (a portion at a slow tempo) and an up-tempo portion (a portion at a fast tempo), if the up-tempo portion is registered as a cue point (register an address ADR2) in advance, and the cue point is specified at a given time point tc (a time point corresponding to an address ADR1) while the slow-tempo portion is being played back, information playback is continued by jumping from the address ADR1 to the address ADR2.

In this case, as shown in FIG. 8($b$), a tempo of the music played before the time point tc is slow and fast after the time point tc, which poses a problem that a discontinuous harsh sound is played at the time point tc.

Also, when the cue point is specified, there may be a time delay until the pickup serving as information readout means moves to the address ADR2, which poses a problem that a harsh sound is played or so-called cut-off of a sound occurs.

Further, in the case of an information recording medium having recorded slow-tempo music and up-tempo music, when the slow-tempo music currently being played is switched to the up-tempo music registered as a cue point in advance, there also arises a problem that a discontinuous harsh sound is played or cut-off of a sound occurs.

When such a harsh sound is played or cut-off of a sound occurs, there arises an inconvenience as follows. That is, the conventional information playback apparatus is used in a discotheque or the like, where a manipulator called a disc jockey creates an enjoyable mood for those who are dancing to the music by instantly performing rap music or the like with the random access playback function and the editing function. However, if the aforementioned harsh sound is played or cut-off of a sound occurs when access is made to the start position of the information playback by the random access playback function, there arises an inconvenience that the disc jockey cannot provide enjoyable dance music which sounds natural.

SUMMARY OF THE INVENTION

The present invention is devised to solve the conventional problems, and therefore, has an object to provide an information playback apparatus for achieving random access playback more quickly while playing a sound which sounds natural.

In order to achieve the above and other objects, an information playback apparatus of the present invention is an information playback apparatus, including: playback means for playing back information recorded in an information recording medium; beat density measuring means for measuring a beat density of the information being played back by the playback means; storage means for, in response to an instruction for cue point registration, storing a cue point indicating a start position of random access playback and the beat density of the information in playback which has been measured by the beat density measuring means; cue point specifying means for instructing the playback means to specify a start of the random access playback from the cue point stored in the storage means; and beat density correcting means for controlling the playback means to correct the beat density of the information to be played back from the cue point in the random access playback. Specifically, when the cue point specifying means specifies the start of the random access playback, the beat density correcting means controls the playback means to start the random access playback by making the beat density of the information (to be played back from the cue point by the random access playback) equal to the beat density of the information measured by the beat density measuring means when the start of the random access playback is specified, thereby correcting a discrepancy between the beat density of the information measured by the beat density measuring means when the start of the random access playback is specified and the beat density stored in the storage means.

According to the information playback apparatus of the present invention arranged as above, so-called cue point registration is completed by storing the cue point indicating the start position of the random access playback and the beat density of the information (being played back) measured by the beat density measuring means into the storage means. Hence, the random access playback can be started from the cue point registered in the storage means when specified by the cue point specifying means.

When the cue point specifying means specifies a start of random access playback at a given time point while an information recoding medium is being played, the beat density correcting means controls the playback means to start the random access playback by making the beat density of the information to be played back from the cue point by the random access playback equal to the beat density of the information measured by the beat density measuring means when the start of the random access playback is specified. Herein, by controlling the playback means to make a correction depending on the discrepancy between the beat density of the information being played back when the cue point specifying means specifies the start of the random access playback and the beat density already stored in the storage means, the playback means is able to start the random access playback at the beat density equal to the beat density of the information measured by the beat density measuring means when the start of the random access playback is specified. This arrangement can eliminate a problem that a playback sound which sounds unnatural is played when information, such as music, recorded in the information recording medium is played back by random access playback.

Also, in order to achieve the above and other objects, the information playback apparatus of the present invention may be arranged in such a manner that the beat density correcting means finds, as the discrepancy, a ratio of the beat density of the information measured by the beat density measuring means when the start of the random access playback is specified and the beat density stored in the storage means, and controls the playback means to correct the beat density of the information to be played back from the cue point by the random access playback in response to the obtained ratio, so that the playback means starts the random access playback at the beat density corrected to be equal to the beat density of the information measured by the beat density measuring means when the start of the random access playback is specified.

According to the information playback apparatus of the present invention arranged as above, the beat density correcting means finds a ratio of the beat density of the information (measured by the beat density measuring means when the start of the random access playback is specified) to the beat density stored in the storage means, and defines the ratio thus found as a discrepancy of the beat densities caused by the random access playback. Then, by controlling the playback means to correct the beat density of the information to be played back from the cue point by the random access playback in response to the ratio thus found, the playback means is able to start the random access playback by making the beat density of the information to be played back by the random access playback equal to the beat density of the information played when the start of the random access playback is specified. This arrangement can eliminate a problem that a playback sound which sounds unnatural is played when information, such as music, recorded in the information recording medium is played back by random access playback.

Also, in order to achieve the above and other objects, an information playback apparatus of the present invention is an information playback apparatus, including: playback means for playing back information recorded in an information recording medium; beat density measuring means for measuring a beat density of the information being played back by the playback means; storage means for, in response to an instruction for cue point registration, storing a cue point indicating a start position of random access playback and the beat density of the information in playback which has been measured by the beat density measuring means; cue point specifying means for instructing the playback means to specify a start of the random access playback from the cue point stored in the storage means; and beat density correcting means for controlling the playback means to correct the beat density of the information to be played back from the cue point in the random access playback. Specifically, when the cue point specifying means specifies the start of the random access playback, the beat density correcting means finds a difference between the beat density of the information measured by the beat density measuring means when the start of the random access playback is specified and the beat density stored in the storage means, and controls the playback means to start the random access playback by changing the beat density of the information (measured by the beat density measuring means when the start of the random access playback is specified) to the beat density of the information to be played back by the random access playback, in response to a quantity of change in the difference over a predetermined time.

According to the information playback apparatus of the present invention arranged as above, so-called cue point registration is completed by storing the cue point indicating the start position of the random access playback and the beat density of the information being played back then and measured by the beat density measuring means into the storage means. Hence, the random access playback is started from the cue point registered in the storage means when specified by the cue point specifying means.

When the cue point specifying means specifies a start of random access playback at a given time point while an information recoding medium is being played, the beat density correcting means finds a difference between the beat density of the information being played back when the start of the random access playback is specified and the beat density already stored in the storage means. Then, the beat density correcting means controls the playback means to start the random access playback by correcting the beat density of the information to be played back by the random access playback, in response to a quantity of change in the difference over a predetermined time. This arrangement not only can prevent an abrupt decrease of the beat density in the case of random access playback, but also can eliminate a problem that a playback sound which sounds unnatural is played when information, such as music, recorded in the information recording medium is played back by random access playback.

BRIEF DESCRIPTION OF THE DRAWINGS

These and other objects and advantages of the present invention will become clear from the following description with reference to the accompanying drawings, wherein.

DETAILED DESCRIPTION OF THE PREFERRED EMBODIMENTS

The following description will describe one embodiment of the present invention with reference to the drawings. Herein, as a preferred embodiment, an explanation will be given to an information playback apparatus called "an effector" provided with an editing function for playing an information recording medium (hereinafter, referred to simply as a disc), such as a CD and a DVD, and producing sound effects by applying signal processing of various kinds to a playback sound.

Figure 1:
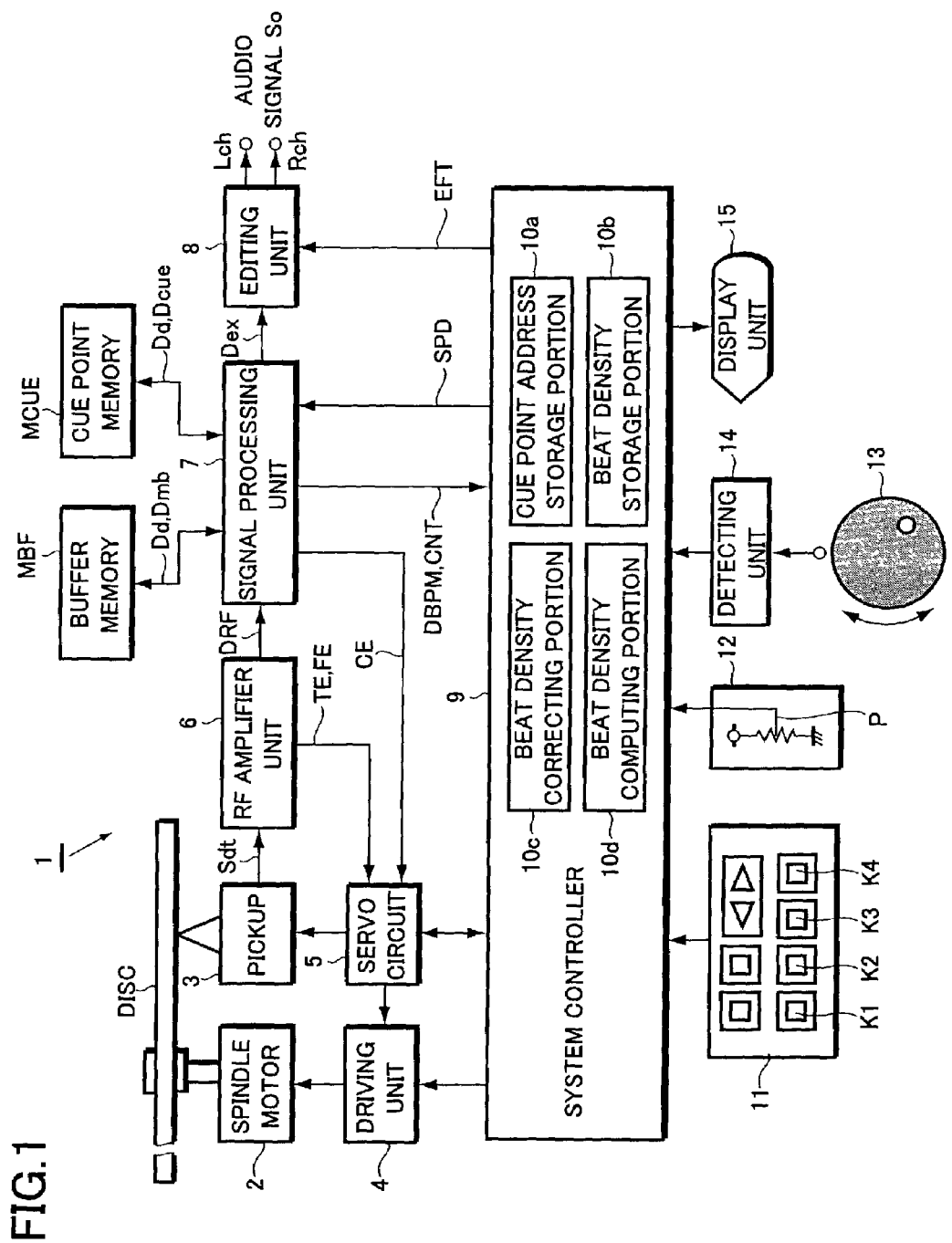
FIG. 1 is a block diagram depicting an arrangement of an information playback apparatus according to one embodiment of the present invention.

FIG. 1 is a block diagram depicting an arrangement of an information playback apparatus 1, which is provided with: a spindle motor 2 for rotating a disc DISC at a certain linear velocity; a pickup 3 for optically reading out information recorded in a recording surface of the disc DISC and outputting a readout signal Sdt; a driving unit 4 for driving the spindle motor 2 with a supply of electrical power; a servo circuit 5 for applying servo control to the driving unit 4 and the pickup 3; and an RF amplifier unit 6.

Further, the information playback apparatus 1 is provided with a signal processing unit 7 serving as information processing means, an editing unit 8, a buffer memory MBF, a cue point memory MCUE, and a system controller 9, plus an input unit 11, a tempo adjusting unit 12, a jog dial 13, a detecting unit 14, and a display unit 15.

The system controller 9 includes a cue point address storage portion 10a, a beat density storage portion 10b, a beat density correcting portion 10c, and a beat density computing portion 10d.

The RF amplifier unit 6 generates playback data (hereinafter, referred to as RF data) DRF from the readout signal Sdt and supplies the same to the signal processing unit 7. Also, it generates various error signals including an error signal TE indicating a tracking error, an error signal FE indicating a focus error, etc. from the readout signal Sdt and supplies the same to the servo circuit 5.

Upon supply of the error signal TE, FE, or the like, the servo circuit 5 applies the servo control to the pickup 3 as to an opposing position with respect to the recording surface of the disc DISC to reduce the occurrence of a tracking error, a focus error, etc. Also, the servo circuit 5 detects a synchronization error based on a synchronization signal CE generated in the signal processing unit 7, and controls the rotations of the spindle motor 2 via the driving unit 4 to reduce the occurrence of the synchronization error.

Although it is not shown in the drawing, a carriage unit for allowing the pickup 3 to move back and forth along the radius of the disc DISC is provided, and so-called random access is achieved by adjusting the position of the pickup 3 with respect to an address in the disc DISC at a command from the system controller 9.

The system controller 9 is composed of a microprocessor (MPU) or the like furnished with computing and controlling functions, and is responsible for the central control on an operation of the entire information playback apparatus 1 in addition to the aforementioned servo control while controlling the signal processing unit 7 and the editing unit 8.

Also, the cue point address storage portion 10a is composed of a semiconductor memory unit incorporated in the microprocessor (MPU). Hence, when the user or the like manipulates a cue point register key K1 described below to be ON, the system controller 9 stores (registers) the address in the disc DISC corresponding to this particular cue point into the cue point address storage portion 10a as cue point address data ADRQ.

As with the cue point address storage portion 10a, the beat density storage portion 10b is composed of a semiconductor memory unit incorporated in the microprocessor (MPU). Upon ON-manipulation of the cue point register key K1 descried below, the beat density storage portion 10b stores data (hereinafter, data indicating a tempo is referred to as the beat density data) indicating a tempo of music or the like being played back at the time point of the ON-manipulation.

In other words, a tempo is defined as beats per unit time (BPM: Beat Per Minute) which determines the tone of music or the like, and in the present invention, the BPM is referred to as beat density. Herein, a beat density measuring portion 7e (see FIG. 2) provided in the signal processing unit 7 described be low measures the BPM (that is, beat density) of music or the like being played and outputs the measurement result as beat density data DBPM.

Then, upon ON-manipulation of the cue point register key K1, the beat density storage portion 10b stores (registers) the latest beat density data DBPM at the time point of the ON-manipulation as beat density data DBPMreg for cue point registration.

The input unit 11 is provided to allow the user or the like to manipulate the information playback apparatus 1, and includes a plurality of manipulation keys.

Typical examples of these manipulation keys include, besides the aforementioned cue point register key K1 used when registering a cue point, cue point specifying keys K2, K3, and K4 for specifying pre-registered cue points as the positions for random access and editing keys manipulated when producing various sound effects, as well as a playback start key, a pause key, and a stop key for specifying the content of playback manipulations, etc.

One cue point register key K1, and a plurality (herein, three) of cue point specifying keys K2, K3, and K4 are provided herein.

When the user or the like manipulates the cue point register key K1 to be ON at different timings while music or the like is being played, the system controller 9 detects addresses of the respective time points of the ON-manipulations in the disc DISC being played as the cue point address data ADRQ, and assigns the respective cue point address data ADRQ to the cue point specifying keys K2, K3, and K4 sequentially and stores (registers) the same into the cue point address-storage portion 10a.

Herein, a decode portion 7b (see FIG. 2) provided in the signal processing unit 7 extracts control data CNT by demodulating the RF data DRF, then the system controller 9 finds the cue point address data ADRQ by obtaining the address data contained in the control data CNT, and stores (registers) the cue point address data ADRQ thus found into the cue point address storage portion 10a.

For example, when the user or the like manipulates the cue point register key K1 to be ON three times at different timings, three cue point address data ADRQ1, ADRQ2, and ADRQ3 are assigned to the three cue point specifying keys K2, K3, and K4 respectively in a one-to-one correspondence and stored (registered) into the cue point address storage portion 10a.

When the user or the like manipulates any of the cue point specifying keys K2, K3, and K4 to be ON at an arbitrary time point during playback after he/she registered the cue points, the system controller 9 reads out the cue point address data ADRQ corresponding to the cue point specifying key which was manipulated to be ON from the cue point address storage portion 10a, and starts processing for so-called random access playback.

Also, a manipulation key (symbol is omitted) called a cue point search key is provided as a manipulation key related to the cue points.

When the user or the like manipulates the cue point search key to be ON, the system controller 9 reads out the cue point address data ADRQ stored in the cue point address storage portion 10a, and displays the same on the display unit 15 in correspondence with the cue point specifying keys K2, K3, and K4.

This allows the user or the like to readily understand which cue point specifying key he/she has to manipulate to be ON for desired random access.

The tempo adjusting unit 12 is composed of a variable resistor, and is provided to edit music or the like recorded in the disc DISC so as to be played as sound effects at a tempo different from its normal tempo.

To be more specific, when the user or the like adjusts an adjusting knob P of the tempo adjusting unit 12 to a predetermined reference position, the system controller 9 supplies the signal processing unit 7 with a control signal SPD indicating a command to perform playback at a normal tempo, whereby music or the like is played at the normal tempo. It should be noted, however, that the system controller 9 controls the signal processing unit 7 to perform playback at the normal tempo not only when the adjusting knob P is set at the predetermined reference position, but also when the jog dial 13 described below is at rest.

On the contrary, when the user or the like deviates the adjusting knob P from the reference position, the system controller 9 finds a difference between a resistance value at the reference position and a resistance value at the deviated position, and controls the signal processing unit 7 with the control signal SPD to play sound effects at a tempo depending on the difference between the resistance values.

The signal processing unit 7 adjusts a tempo at a command from the system controller 9, and a tempo adjusting method will be described in detail below.

The jog dial 13 is a disc-like rotator rotatable in a clockwise direction and in a counterclockwise direction, and as with the tempo adjusting unit 12, it is provided to edit music or the like recorded in the disc DISC so as to be played as sound effects at a tempo different from its normal tempo.

The detecting unit 14 is provided with a rotary encoder for detecting a rotational speed and a rotational direction of the jog dial 13, and it supplies the detection result from the rotary encoder to the system controller 9.

Upon receipt of the detection result from the detecting unit 14, the system controller 9 directs the signal processing unit 7 to perform forward playback or reverse playback depending on the rotational direction of the jog dial 13, and controls the signal processing unit 7 with the control signal SPD to perform forward playback or reverse playback at a tempo corresponding to the rotational speed of the jog dial 13.

When the jog dial 13 is manipulated to rotate, the signal processing unit 7 adjusts a tempo at a command from the system controller 9 in the same manner when the tempo adjusting unit 12 is manipulated, and a tempo adjusting method will be described in detail below.

Further, the detecting unit 14 is provided with a pressure detecting sensor for detecting a pressing pressure when the user or the like touches the jog dial 13 by hand, and it supplies the system controller 9 with the detection result of the pressing pressure.

To be more specific, a distortion sensing element whose resistance value varies with a pressing pressure is provided at the back surface of the jog dial 13, and when the user or the like manipulates the jog dial 13 to be depressed by tapping the ceiling portion with a force at or above a predetermined value, the pressure detecting sensor supplies the system controller 9 with a change in the resistance value of the distortion sensing element as the detection result of a pressing pressure.

Upon supply of the detection result of the pressing pressure, the system controller 9 measures the number of depressed manipulations per unit time, and judges that the number of depressed manipulations per unit time thus measured is a tempo of sound effects the user or the like desires, whereupon the system controller 9 starts to control the signal processing unit 7 with the control signal SPD to play sound effects at the tempo the user or the like desires.

When the jog dial 13 is manipulated to be depressed, the signal processing unit 7 adjusts a tempo at a command from the system controller 9 in the same manner when the tempo adjusting unit 12 is manipulated or the jog dial 13 is manipulated to rotate, and a tempo adjusting method will be described in detail below.

As has been described, the user or the like manipulates the tempo adjusting unit 12 and the jog dial 13 when he/she wishes to play sound effects at a tempo different from the original music or the like.

Although both the tempo adjusting unit 12 and the jog dial 13 are provided to adjust a tempo of the sound effects, they function slight differently from each other.

To begin with, the tempo adjusting unit 12 is arranged to adjust a tempo of the sound effects depending on a quantity of deviation (a difference between the resistance values) from the reference position of the adjusting knob P, and therefore, it is possible to continue playback at the tempo corresponding to the quantity of deviation by allowing the adjusting knob P to stay at rest at the deviated position. Thus, the tempo adjusting unit 12 is furnished with a function for adjusting a tempo of the sound effects statically.

On the contrary, the jog dial 13 is arranged to change a tempo of the sound effects depending on a rotational speed while it is manipulated to rotate, and when the rotational manipulation is stopped, playback is performed at the tempo set by the adjusting knob P of the tempo adjusting unit 12. Thus, the jog dial 13 is furnished with a function for adjusting a tempo of the sound effects dynamically.

Further, the jog dial 13 is arranged to change a tempo of the sound effects in response to a speed of the depressed manipulation only when the jog dial 13 is manipulated to be depressed while it is at rest. Hence, the system controller 9 controls the signal processing unit 7 to adjust a tempo of the sound effects when the jog dial 13 is manipulated to rotate first, and then to change a tempo of the sound effects in response to a speed of the depressed manipulation only when the jog dial 13 is at rest.

Further, when the tempo adjusting unit 12 and the jog dial 13 are manipulated in combination, synergistic effects can be attained.

As one example manipulation, when the user or the like manipulates the jog dial 13 at rest to be depressed while he/she sets the adjusting knob P of the tempo adjusting unit 12 at a desired position, the system controller 9 finds a new tempo by adding a tempo corresponding to the position of the adjusting knob P to a tempo corresponding to a speed of the depressed manipulation, and controls the signal processing unit 7 with the control signal SPD to play sound effects at the new tempo thus found.

Also, when the user or the like manipulates the jog dial 13 to rotate while he/she sets the adjusting knob P of the tempo adjusting unit 12 at a desired position, the system controller 9 finds a new tempo by adding a tempo corresponding to the position of the adjusting knob P to a tempo corresponding to a rotational speed, and controls the signal processing unit 7 with the control signal SPD to play sound effects at the new tempo thus found.

By manipulating the tempo adjusting unit 12 and the jog dial 13 in combination in this manner, the signal processing unit 7 plays music or the like by changing the original tempo in various manners, thereby making it possible to produce various sound effects at different tempos.

The display unit 15 is composed of a display element, such as a liquid crystal display, and displays on-screen menus for presenting a manipulation method, etc. to the user or the like, the aforementioned cue point address data ADRQ, and an operation status of the information playback apparatus 1.

The signal processing unit 7 is composed of a digital signal processor (DSP) furnished with a computing function. As shown in a block diagram of FIG. 2, the signal processing unit 7 includes a decode portion 7b, an address control portion 7c, a read/write control portion 7d, and a beat density measuring portion 7e, and a temporary storage portion 7a (not shown in FIG. 1) composed of a semiconductor memory, the buffer memory MBF, and the cue point memory MCUE are connected to the signal processing unit 7.

The decode portion 7b generates demodulation data (symbol is omitted) by decoding the RF data DRF with a method in conformity with the standard of CDs and DVDs. Further, the decode portion 7b separates and extracts audio playback data and control data CNT for controlling seamless playback from the demodulation data, and decodes the audio playback data into audio data Dd which makes seamless playback possible in accordance with the control contents in the control data CNT for seamless playback.

In other words, the control data CNT is the control data to achieve seamless playback of the address data, data of playback times corresponding to the addresses, synchronization data, program chain information (PGCI), etc. prerecorded in the disc DISC, and in accordance with the control data CNT, the decode portion 7b decodes the audio playback data contained randomly in the RF data DRF into a stream of the continuous audio data Dd which makes seamless playback possible.

Also, the decode portion 7b supplies the system controller 9 with the control data CNT thus separated and extracted, so that the system controller 9 obtains the cue point address data ADRQ from the address data contained in the control data CNT and stores the same into the cue point address storage portion 10a.

The temporary storage portion 7a stores the RF data DRF from the RF amplifier unit 6 temporarily, and is provided as a work area when the decode portion 7b generates the audio data Dd which makes seamless playback possible and the control data CNT by decoding the RF data DRF.

The beat density measuring portion 7e measures the aforementioned beat density (in other words, a tempo) of music or the like currently being played from the audio data Dd decoded by the decode portion 7b.

In other words, the beat density measuring portion 7e generates audio data Dd1 stressing tempo components by allowing the audio data Dd which makes seamless playback possible and is decoded one after another by the decode portion 7b to pass through a digital band-pass filter (not shown) in a predetermined frequency band, and compares the audio data Dd1 with a predetermined threshold. Then, the beat density measuring portion 7e extracts the audio data Dd1 at levels higher than the predetermined threshold as audio data Dd2 indicating the tempo components. Further, it counts the number of generation of the audio data Dd2 per unit time, and judges the counted number of generation per unit time as the beat density (in other words, a tempo) of music or the like currently being played, and outputs beat density data DBPM to the system controller 9.

In short, the beat density measuring portion 7e is provided to measure the true beat density of music or the like recorded in the disc DISC in real time.

The buffer memory MBF is composed of a ring memory having a predetermined memory capacity, and it stores the audio data Dd for seamless playback decoded by the decode portion 7b at writing addresses specified by the address control portion 7c and the read/write control portion 7d. Further, it outputs the audio data Dd thus stored as audio data Dmb needed for actual audio playback from readout addresses specified by the address control portion 7c and the read/write control portion 7d.

The cue point memory MCUE is composed of a semiconductor memory having a predetermined memory capacity, and stores the audio data Dd for seamless playback decoded by the decode portion 7b at writing addresses specified by the address control portion 7c and the read/write control portion 7d. Further, it outputs the audio data Dd thus stored as audio data Dcue for random access playback from the readout addresses specified by the address control portion 7c and the read/write control portion 7d.

It should be noted, however, that the buffer memory MBF buffers the audio data Dd supplied from the decode portion 7b and outputs the same as the audio data Dmb when continuously playing back information recorded in the disc DISC.

On the contrary, the cue point memory MCUE stores a predetermined volume of the audio data Dd positioned prior to and subsequent to each other in reference to a cue point when the user or the like specifies registration of the cue point with the cue point register key K1, and when the user or the like specifies the cue point with any of the corresponding cue point specifying keys K2, K3, and K4 later, it outputs the audio data Dd stored therein as the audio data Dcue for random access playback.

Figure 2:
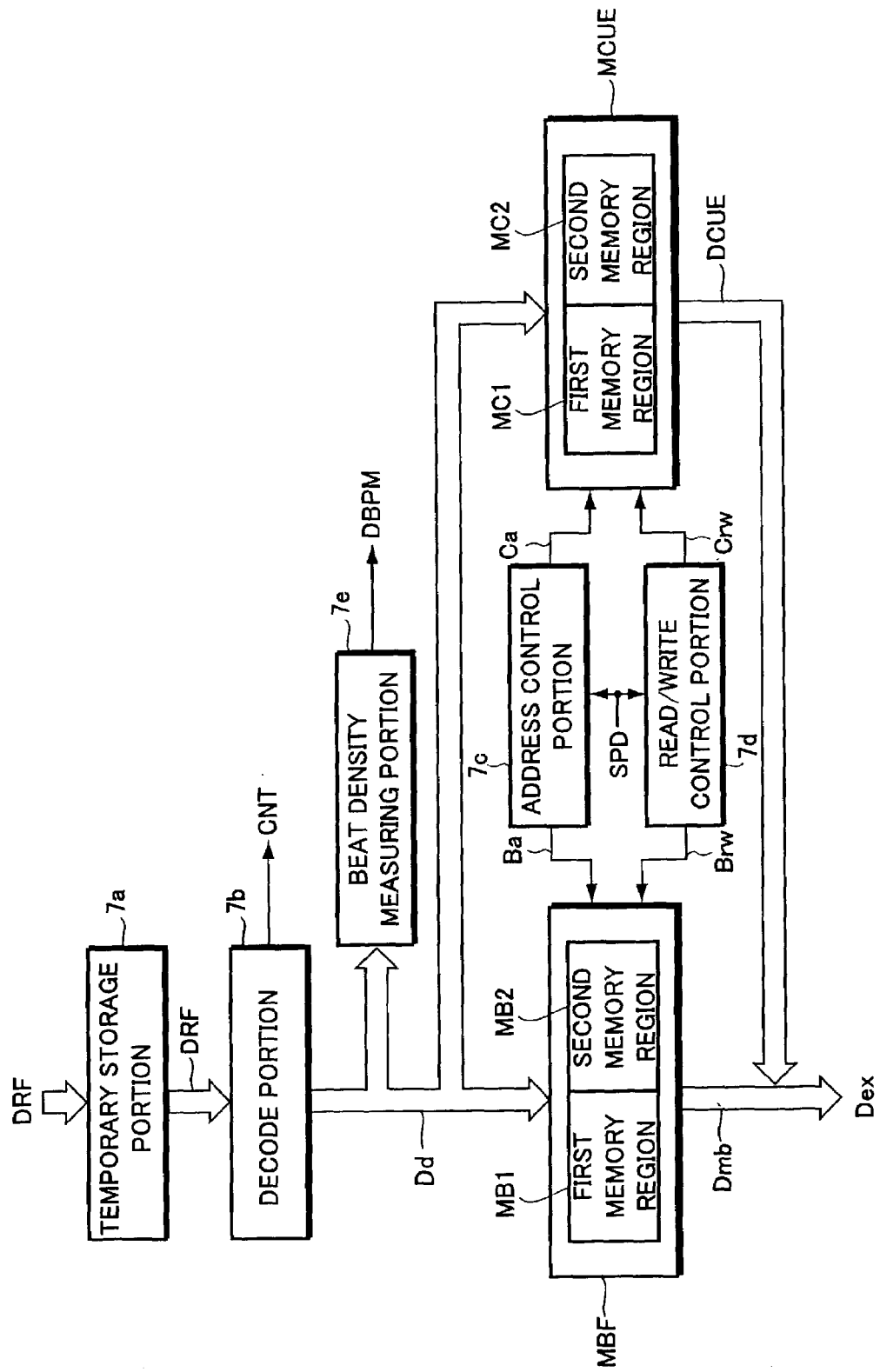
FIG. 2 is a block diagram depicting an arrangement of a signal processing unit, a buffer memory, and a cue point memory provided in the information playback apparatus of the present embodiment.
Figure 3:
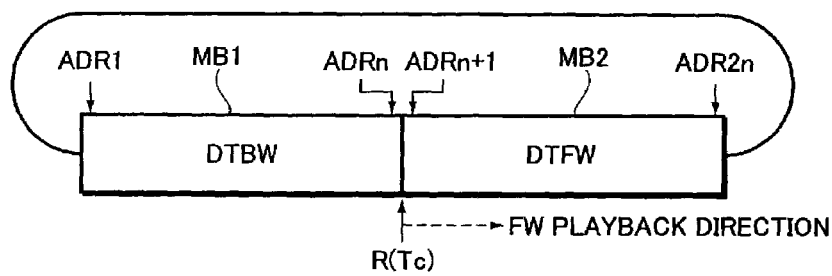
FIGS. 3(a) through 3(c) are schematic views explaining functions of the buffer memory, in particular, the function in the case of forward playback.
Figure 3:
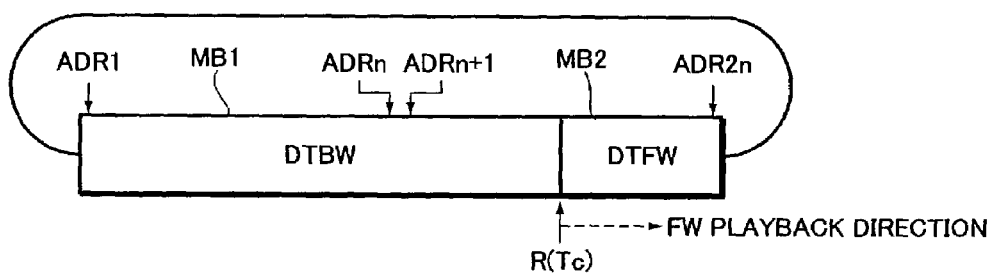
Figure 3:
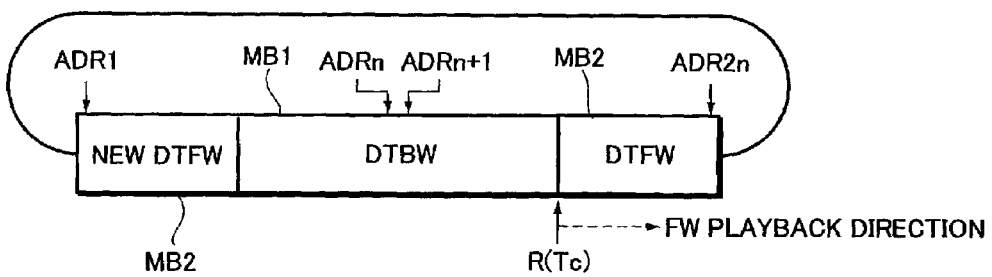
Figure 4:
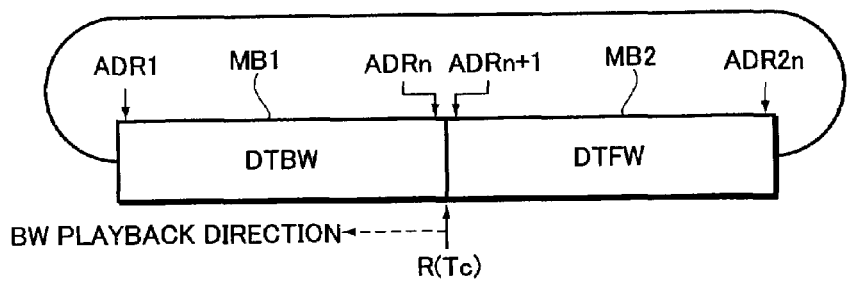
FIGS. 4(a) through 4(c) are schematic views explaining functions of the buffer memory, in particular, the function in the case of reverse playback.
Figure 4:
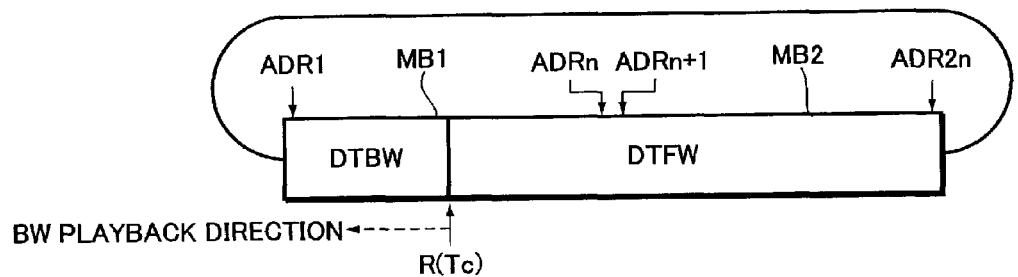
Figure 4:
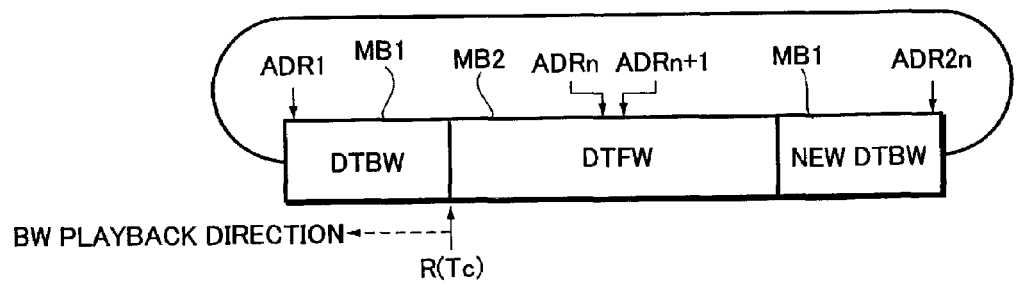

Further, only one cue point memory MCUE is shown in FIGS. 1 and 2. However, in practice, as many cue point memories MCUEs as registerable cue points, that is, three cue point memories MCUEs respectively corresponding to the cue point specifying keys K2, K3, and K4 are provided.

Then, the audio data Dmb readout successively from the buffer memory MBF or the audio data Dcue read out successively from the cue point memory MCUE is supplied to the editing unit 8 as an audio data string Dex.

The address control portion 7c generates address data Ba specifying addresses in the buffer memory MBF and address data Ca specifying addresses in the cue point memory MCUE at a command from the system controller 9.

At a command from the system controller 9, the read/write control portion 7d controls data writing and data readout operations with respect to the buffer memory MBF and data writing and data readout operations with respect to the cue point memory MCUE by supplying read/write control signals Brw and Crw to the buffer memory MBF and the cue point memory MCUE, respectively.

To be more specific, the address control portion 7c and the read/write control portion 7d set writing addresses or readout addresses in the buffer memory MBF with the address data Ba and the read/write control signal Brw, and set writing addresses or readout addresses in the cue point memory MCUE with the address data Ca and the read/write control signal Crw.

Further, the address control portion 7c and the read/write control portion 7d set memory access timing (a switching speed when successively switching readout addresses) when reading out the audio data Dmb from the buffer memory MBF according to the control signal SPD from the system controller 9.

By adjusting the readout address switching speed with respect to the buffer memory MBF according to the control signal SPD, it is possible to edit music or the like recorded in the disc DISC so as to be played as sound effects at a tempo different from its normal tempo as described above.

In other words, when the user specifies a tempo of the sound effects by manipulating the tempo adjusting unit 12 or by manipulating the jog dial 13 to rotate or to be depressed and the control signal SPD indicating the specified tempo is supplied from the system controller 9 as described above, the address control portion 7c and the read/write control portion 7d switch the readout addresses at a speed in proportion to the specified tempo.

Hence, when the control signal SPD specifies playback at a fast tempo, the readout address switching speed with respect to the buffer memory MBF becomes faster, which increases the number of the audio data Dmb read out per unit time from the buffer memory MBF. On the other hand, when the control signal SPD specifies playback at a slow tempo, the readout address switching speed with respect to the buffer memory MBF becomes slower, which decreases the number of the audio data Dmb read out per unit time from the buffer memory MBF.

Then, the audio data string Dex composed of the adjusted number of the audio data Dmb per unit time is supplied to the editing unit 8, and a digital-to-analog converter (not shown) incorporated in the editing unit 8 applies digital-to-analog conversion to the audio data string Dex, whereby an analog audio signal So for playing sound effects at a tempo different from the normal tempo of music or the like recorded in the disc DISC is produced.

In addition, when the address control portion 7c and the read/write control portion 7d read out the audio data Dcue for random access playback from the cue point memory MCUE, they also adjust the number of the audio data Dcue read out per unit time by switching the readout addresses at a speed in proportion to the tempo specified by the control signal SPD.

Hence, the audio data string Dex composed of the adjusted number of the audio data Dcue per unit time is supplied to the editing unit 8, and the aforementioned digital-to-analog converter incorporated in the editing unit 8 applies digital-to-analog conversion to the audio data string Dex, whereby an analog audio signal So for playing sound effects at a tempo different from the normal tempo of music or the like recorded in the disc DISC is produced.

Further, when the address control portion 7c and the read/write control portion 7d store the audio data Dd from the decode portion 7b into the buffer memory MBF, they store the order of playback times and the order of addresses in a one-to-one correspondence, whereby the audio data Dd can be stored without disturbing the order which makes seamless playback possible.

Furthermore, as with the storing into the buffer memory MBF, the address control portion 7c and the read/write portion 7d store the audio data Dd into the cue point memory MCUE without disturbing the order which makes seamless playback possible.

Moreover, each of the address control portion 7c and read/write control portion 7d makes memory access to the buffer memory MBF and the cue point memory MCUE separately, which inhibits simultaneous readout of the playback audio data Dmb and Dcue. Consequently, the audio data Dmb and the audio data Dcue are supplied separately to the editing unit 8 as the audio data string Dex.

Because it is arranged in such a manner that the audio data Dd from the decode portion 7b is stored into the buffer memory MBF and the cue point memory MCUE first, and then outputted as the audio data Dmb and Dcue, the processing by the pickup 3 for reading out information from the disc DISC and the processing within the signal processing unit 7 for audio playback do not interfere with each other.

Next, the following description will further describe, with reference to FIGS. 3(a) through 4(c), the functions of the buffer memory MBF and the cue point memory MCUE under the control of the system controller 9, the address control portion 7c, and the read/write control portion 7d.

Firstly, an explanation will be given to the function of the buffer memory MBF.

As schematically shown in FIG. 3(a), the buffer memory MBF is composed of a ring memory capable of storing up to 2n (n is a relatively large positive number) audio data Dd which makes seamless playback possible.

The ring memory is a memory to which memory access is made based on physical addresses ADR1 through ADR2n, and is of an endless logical configuration without having any reference as to which physical address is the address at the lowest order or which physical address is the address at the highest order.

However, the system controller 9 uses a current playback time (hereinafter, referred to as the current playback time point) Tc and a readout address R(Tc) at the current playback time point Tc as the reference, and manages the buffer memory MBF by defining a memory region where up to n audio data (hereinafter, referred to as past audio data DTBW) belonging to a playback time prior to the current playback time point Tc is stored as a first memory region MB1, and a memory region where up to n audio data (hereinafter, referred to as future audio data DTFW) belonging to a playback time subsequent to the current playback time point Tc is stored as a second memory region MB2.

For example, as shown in FIG. 3(a), given a physical address ADRn as the readout address R(Tc) in association with the jog dial 13 at a given current playback time point Tc during audio playback, then the system controller 9 manages a region from the physical addresses ADR1 through ADRn as the first memory region MB1 and a region from the physical addresses ADRn+1 through ADR2n as the second memory region MB2.

Herein, forward playback is achieved as the address control portion 7c and the read/write control portion 7d move the readout address R(Tc) toward the second memory region MB2 (in a FW playback direction of the drawing) while the jog dial 13 is at rest or in association with rotations of the jog dial 13 in the forward direction. Also, reverse playback is achieved as the address control portion 7c and the read/write control portion 7d move the readout address R(Tc) toward the first memory region MB1 (in a reverse direction to the FW playback direction of the drawing) in association with rotations of the jog dial 13 in the reverse direction.

Also, as has been described, by changing the switching speed when moving the readout address R(Tc) successively during forward playback or reverse playback as specified by the control signal SPD, the number of the audio data Dmb read out per unit time from the buffer memory MBF can be changed, which, as a result, changes a tempo of the sound effects.

Further, as shown in FIG. 3(b) by way of example, when the readout address R(Tc) is moved toward the second memory region MB2 during forward playback, the future audio data DTFW successively turns to the past audio data DTBW. Hence, a volume of the future audio data DTFW decreases and a volume of the past audio data DTBW increases with a lapse of time. If forward playback is continued under these conditions, there occurs an unwanted event that the future audio data DTFW needed for audio playback becomes short.

Accordingly, the system controller 9 computes a difference (Nps−Nft) between the number Nps of the past audio data DTBW present within the first memory region MB1 and the number Nft of the future audio data DTFW present within the second memory region MB2 each time the readout address R(Tc) moves.

When the difference (Nps−Nft) reaches a predetermined threshold value Hthd, the system controller 9 directs the pickup 3 and the decode portion 7b to generate audio data (audio data in the number equivalent to the difference (Nps−Nft)) which makes seamless playback possible and is farther than the future audio data DTFW currently present within the second memory region MB2, and replaces the past audio data (audio data in the number equivalent to the difference (Nps−Nft)) in the oldest playback time within the first memory region MB1 with the newly generated future audio data to be stored therein, whereby the future audio data DTFW is replenished.

For example, as shown in FIG. 3(c) by way of example, of the entire first memory region MB1, the system controller 9 stores the newly generated future audio data into a memory region (a memory region denoted as "new DTFW" in the drawing) in an endless relation with the second memory region MB2.

Consequently, the number Nps of the past audio data DTBW and the number Nft of the future audio data DTFW become equal in reference to the readout address R(Tc) corresponding to the current playback time point Tc, which makes it possible to forestall an unwanted event that the audio data Dmb needed for audio playback becomes short during forward playback.

Also, as shown in FIG. 4(a) by way of example, when the number Nps of the past audio data DTBW decreases and the number Nft of the future audio data DTFW increases as the readout address R(Tc) corresponding to the current playback time point Tc moves toward the first memory region MB1 (in a BW playback direction of the drawing) during reverse playback, the system controller 9 also performs control to make the number Nps of the past audio data DTBW and the number Nft of the future audio data DTFW equal.

To be more specific, the system controller 9 computes a difference (Nps−Nft) between the number Nps of the past audio data DTBW and the number Nft of the future audio data DTFW each time the readout address R(Tc) moves toward the first memory region MB1. Then, as shown in FIG. 4(b) by way of example, when the difference (Nps−Nft) reaches a predetermined threshold value −Nthd, the system controller 9 directs the pickup 3 and the decode portion 7b to generate audio data (audio data in the number equivalent to the difference (Nps−Nft)) which makes seamless playback possible and is older than the past audio data DTBW currently present within the first memory region MB1.

Then, as shown in FIG. 4(c) by way of example, of the entire second memory region MB2, the system controller 9 stores the newly generated past audio data into a memory region (a memory region denoted as "new DTBW" in the drawing) in an endless relation with the first memory region MB1.

Consequently, the number Nps of the past audio data DTBW and the number Nft of the future audio data DTFW become equal in reference to the readout address R(Tc) corresponding to the current playback time point Tc, which makes it possible to forestall an unwanted event that the audio data Dmb needed for audio playback becomes short during reverse playback.

Next, the following description will describe the function of the cue point memory MCUE.

By referring to FIG. 2 again, as with the buffer memory MBF, the cue point memory MCUE is provided with a first memory region MC1 and a second memory region MC2, and the physical address positioned at the boundary between the first region MC1 and the second memory region MC2 is determined as the position of the cue point. In other words, the physical address positioned at the boundary between the first memory region MC1 and the second memory region MC2 is the readout address R(Tc) corresponding to the initial current playback time point Tc when random access playback is started.

The first memory region MC1 stores the audio data (past audio data) belonging to the playback time prior to the position of the cue point, and the second memory region MC2 stores the audio data (future audio data) belonging to the playback time subsequent to the position of the cue point.

It should be noted, however, that the cue point memory MCUE is not a ring memory, and the physical addresses ADR1 through ADRn and the physical addresses ADRn+1 through ADR2n are fixed in the first memory region MC1 and the second memory region MC2, respectively.

Thus, assume that the future audio data and the past audio data related to a cue point registered by the user or the like in advance have been stored, and the user or the like specifies the cue point, then the system controller 9 reads out the cue point address data ADRQ of the specified cue point from the cue point address storage portion 10a, and the address control portion 7c and the read/write control portion 7d set the cue point address data ADRQ as the readout address R(Tc) corresponding to the initial current playback time point Tc when random access playback is started. Further, in the case of forward playback, the readout address R(Tc) is moved toward the second memory region MC2, and in the case of reverse playback, the readout address R(Tc) is moved toward the first memory region MC1, whereby random access playback is achieved.

Further, while the pre-stored future or past audio data is being read out, the system controller 9 controls the pickup 3 to read out information to generate audio data which makes seamless playback possible following the audio data in the cue point memory MCUE, and stores the decoded audio data Dd outputted from the decode portion 7b as the result of this information reading into the buffer memory MBF.

When the first memory region MB1 and the second memory region MB2 in the buffer memory MBF have stored 2n audio data Dd which makes seamless playback possible, the data readout from the cue point memory MCUE is stopped and switched to readout of the audio data Dmb from the buffer memory MBF, after which an operation for the aforementioned forward playback, reverse playback, or shuttle playback is started.

When the user or the like specifies either forward playback or reverse playback by their respective predetermined function keys provided in the input unit 11 substantially at the same time he/she specifies the cue point for random access, or when the user or the like specifies any of forward playback, reverse playback, and shuttle playback by manipulating the jog dial 13 substantially at the same time he/she specifies the cue point for random access, a quick response is made by reading out the audio data Dcue corresponding to the current playback time point Tc from the future or past audio data stored in the cue point memory MCUE first, and subsequently the readout address R(Tc) is moved in the forward playback direction or in the reverse playback direction in association with the rotational direction or the like of the jog dial 13, whereby quick random access playback is achieved.

When the audio data which makes seamless playback possible has been stored into the buffer memory MBF while random access playback is performed based on the audio data Dcue in the cue point memory MCUE, the data readout from the cue point memory MCUE is stopped and switched to the readout of the audio data Dmb from the buffer memory MBF.

Memory capacities of the buffer memory MBF and the cue point memory MCUE, that is, the number n of the storable audio data in each of the first memory regions MB1 and MC1 and the second memory regions MB2 and MC2, are set in such a manner that the audio data Dd in each of the memory regions MB1, MC1, MB2, and MC2 will never be short even when the pickup 3 reads out information from the disc DISC while audio playback is being performed based on the audio data Dmb and Dcue read out from the respective memory regions MB1, MC1, MB2, and MC2.

In other words, by securing the number n of storable data within a minimum range so that the audio data Dmb and Dcue will not be used up during a time required for the pickup 3 to read out information from the disc DISC to generate the audio data Dd for seamless playback, it is possible to always achieve seamless playback.

The editing unit 8 outputs the analog audio signal So to sound a speaker by applying digital-to-analog conversion to the audio data string Dex supplied from the signal processing unit 7 with the aforementioned digital-to-analog converter and then applying power amplification. Also, in a case where the audio data string Dex of the stereo system is supplied, the editing unit 8 isolates channels and outputs the analog audio signal So for each channel.

When the tempo adjusting unit 12 or the jog dial 13 is manipulated and the audio data string Dex for performing playback at a tempo different from the normal tempo of music or the like is supplied from the signal processing unit 7, the aforementioned digital-to-analog converter outputs the analog audio signal So which can produce sound effects at a tempo different from the normal tempo.

Further, the editing unit 8 pre-stores modulation data, such as a sawtooth wave, a rectangular wave, a triangular wave, a waveform imitating a sound of a jet plane. Hence, when the user or the like specifies desired modulation data by manipulating a corresponding editing key in the input unit 11 and the system controller 9 specifies editing processing with specification data EFT, the editing unit 8 modulates the audio data string Dex with the specified modulation data, and converts the modulated audio data into the analog audio signal So with the digital-to-analog converter to be outputted. This arrangement makes it possible to produce various sound effects.

Also, when the user or the like selects the modulation data while he/she manipulates the tempo adjusting unit 12 or the jog dial 13, the sound effects modulated by the modulation data can be produced at a different tempo.

The beat density computing portion 10d is achieved by running a predetermined system program on the microprocessor (MPU).

The beat density computing portion 10d is provided to find the beat density of the analog audio signal So outputted from the editing unit 8, that is, the beat density of a playback sound to be outputted actually from a speaker or the like.

However, the beat density is not found from the actual playback sound herein, and instead, the beat density (that is, a tempo) of a playback sound is computed based on the beat density data DBPM successively outputted from the beat density measuring portion 7e, the beat density data DBPMreg stored (registered) in the beat density storage portion 10b, and the aforementioned memory access timing (a switching speed when successively switching the readout addresses) with respect to the buffer memory MBF or the cue point memory MCUE.

In other words, when the user or the like manipulates the tempo adjusting unit 12 or the jog dial 13, the system controller 9 judges a tempo corresponding to the rotational speed or a depressed speed of the jog dial 13 or a tempo set by the tempo adjusting unit 12, and outputs the control signal SPD for setting the readout address switching speed with respect to the buffer memory MBF or the cue point memory MCUE.

The beat density computing portion 10d detects the readout address switching speed with respect to the buffer memory MBF or the cue point memory MCUE based on the control signal SPD. Then, it searches a coefficient value a in proportion to the readout address switching speed from a database (not shown), such as a pre-installed look-up table, and multiplies the beat density data DBPM by the coefficient value α, whereby the beat density (α×DBPM) of an actual playback sound, that is, a tempo of the actual playback sound, is computed.

As has been described, by correcting the beat density data DBPM indicating the true beat density of music or the like based on the coefficient value α in proportion to the readout address switching speed, it is possible to find the actual beat density (α×DBPM) of the sound effects adjusted by the tempo adjusting unit 12 and the jog dial 13.

Further, when the user or the like manipulates the cue point specifying key to be ON and specifies a start of random access playback, the beat density computing portion 10d finds the beat density (α×DBPM) of an actual playback sound at the time point at which the cue point is specified, and obtains the beat density data DBPMreg stored in the beat density storage portion 10b. Then, it multiplies the beat density data DBPMreg by the coefficient value α, whereby the beat density (α×DBPMreg) of a playback sound to be played at the instant following the start of the random access playback is computed.

In other words, when the cue point specifying key is manipulated to be ON and a start of the random access playback is specified, the beat density computing portion 10d not only computes the beat density (α×DBPM) of an actual playback sound when the cue point is specified, but also computes in advance the predicted beat density (α×DBPMreg) of a playback sound to be played at the start of the random access playback.

As with the beat density computing portion 10d, the beat density correcting portion 10c is achieved by running a predetermined system program on the microprocessor (MPU), and performs correction processing for preventing the cut-off of a sound as well as a harsh sound in the case of random access playback.

To be more specific, when a start of random access playback is specified by the ON-manipulation of the cue point specifying key, the beat density correcting portion 10c obtains data of the aforementioned beat densities (α×DBPM) and (α×DBPMreg) from the beat density computing portion 10d.

Then, it computes an absolute value |(α×DBPM)−(α×DBPMreg)| of a difference between the beat densities (α×DBPM) and (α ×DBPMreg).

Upon judging that the absolute value |(α×DBPM)−(α×DBPMreg)| is greater than a predetermined threshold, then it judges that a changing rate of the beat density from the beat density (α×DBPM) to the beat density (α×DBPMreg) is too large, and performs correction processing to make a changing rate of the beat density more moderate.

Although the correction processing will be described in more detail below when explaining an operation with reference to FIGS. 7(a) and 7(b), the readout address switching speed when reading out the audio data Dcue from the cue point memory MCUE is controlled by the control signal SPD in such a manner that the switching speed is gradually changed step by step from a speed corresponding to the beat density (α×DBPM) to a speed corresponding to the beat density (α×DBPMreg).

By gradually changing the readout address switching speed with respect to the cue point memory MCUE in response to the beat density in a range from the beat density (α×DBPM) to the beat density (α×DBPMreg), a tempo is changed with continuity when a playback sound at the time point at which the cue point is specified changes to a sound to be played after the random access playback is started, thereby making it possible to play a sound which sounds natural.

Figure 5:
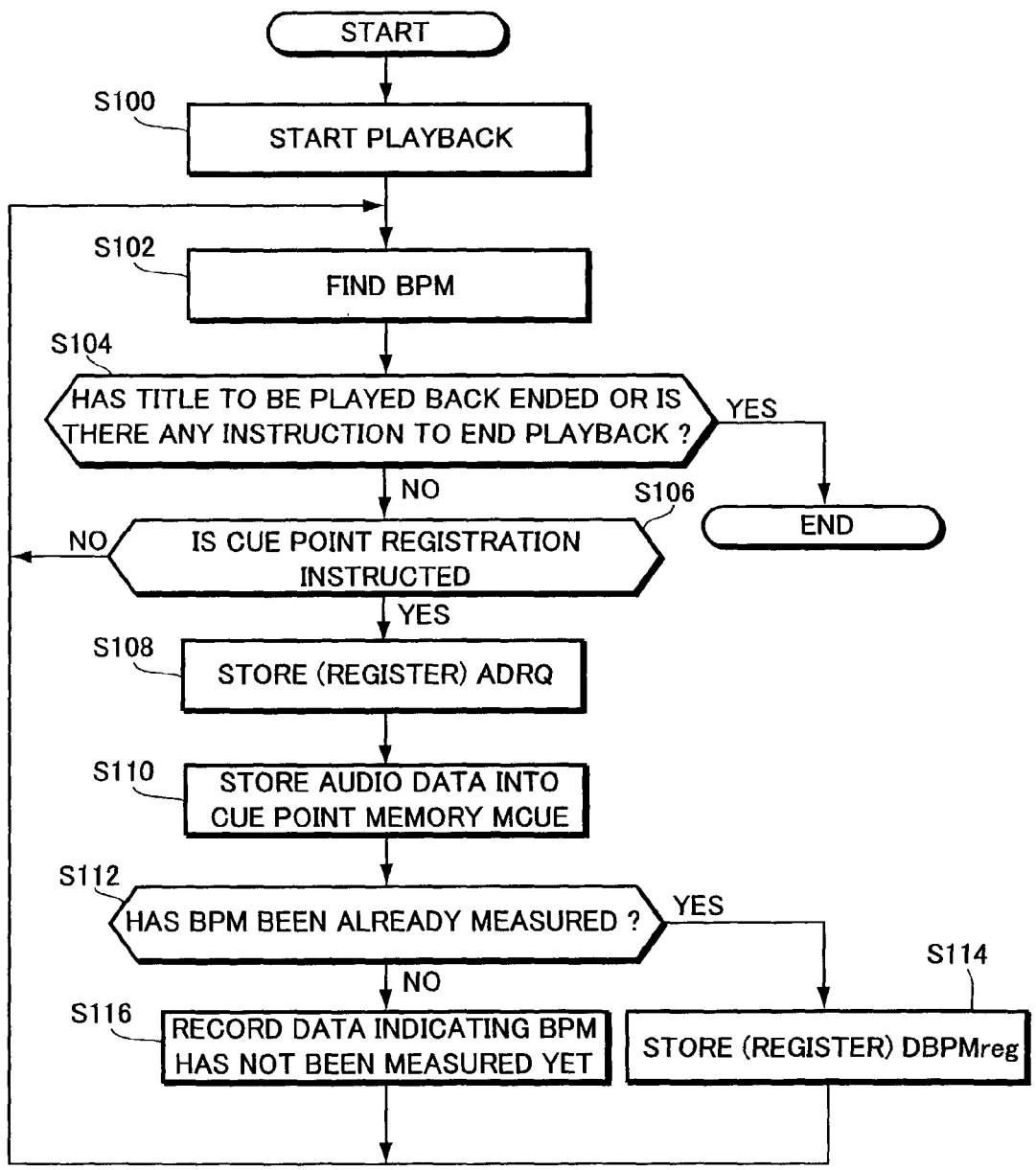
FIG. 5 is a flowchart detailing an operation of the information playback apparatus of the present embodiment when a cue point is registered.
Figure 6:
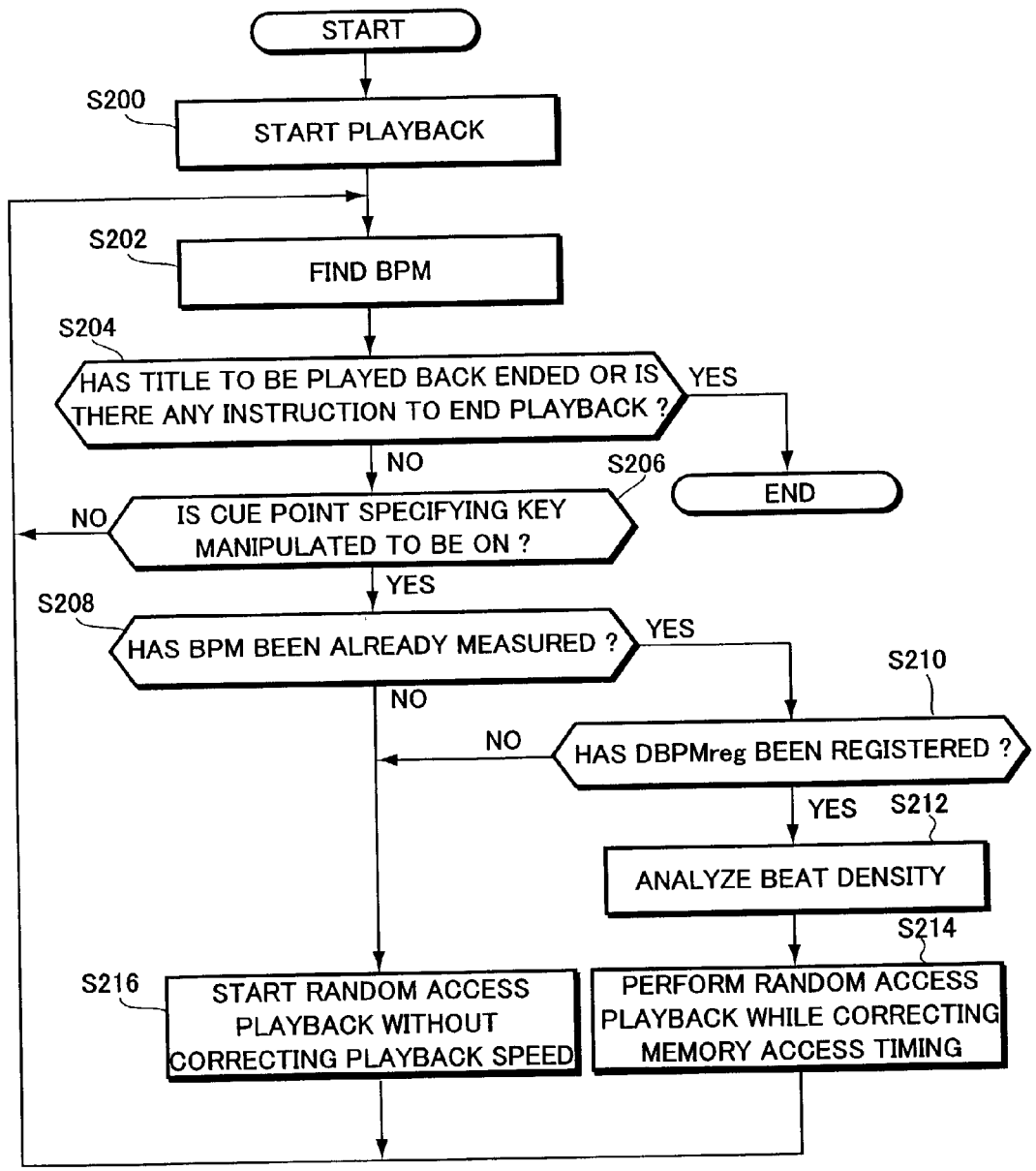
FIG. 6 is a flowchart detailing an operation of the information playback apparatus of the present embodiment when random access playback is started.

Next, the following description will describe an operation of the information playback apparatus 1 arranged as above with reference to flowcharts of FIGS. 5 and 6. FIG. 5 shows an operation when the user or the like specifies registration of a cue point, and FIG. 6 shows an operation when the user or the like specifies the cue point after the cue point is registered.

Referring to FIG. 5, audio playback is started when the user or the like inserts the disc DISC and manipulates the play start key of the input unit 11 to be ON (Step S100).

Subsequently, playback is performed at a tempo set by the tempo adjusting unit 12, and further, when the user or the like manipulates the jog dial 13 to rotate, forward playback or reverse playback is performed at a tempo depending on a rotational direction and a rotational speed of the jog dial 13.

When the user or the like manipulates the jog dial 13 to be depressed, forward playback is performed at a tempo depending on a speed of the depressed manipulation.

In this manner, processing in Steps S102 through S116 described below is performed while the playback operation is performed according to the manipulations by the user or the like.

Firstly, in Step S102, the beat density measuring portion 7e measures the true beat density (true tempo) of music or the like currently being played, and supplies the system controller 9 with the measurement result as the beat density data DBPM.

Because the beat density is defined as beats per unit time, it takes a certain time to measure the beat density. Hence, even when the processing in Steps S104 through S116 described below is being performed, the beat density measuring portion 7e always continues the processing for counting the beats within the required time, and generates the beat density data DBPM at the current playback time point Tc by computing a ratio of the beats counted up to the end of the required time and the required time. Hence, by repeating the same processing for each required time, the latest beat density data DBPM at the current playback time point Tc is outputted sequentially.

Then, in Step S104, whether the entire information (for example, music) stored in the disc DISC has been played back, or the user or the like specifies to stop the playback via the input unit 11 is judged. When the condition falls under either of these playback ending conditions, (in the case of YES), the playback processing is terminated; otherwise, (in the case of NO), the flow proceeds to Step S106.

In Step S106, whether the cue point register key K1 is manipulated to be ON and registration of the cue point for random access playback is specified is judged. When the cue point register key K1 is not manipulated to be ON, the processing from Step S102 is repeated; otherwise, the flow proceeds to Step S108.

In Step S108, the address corresponding to the current playback time point Tc is found from the control data CNT in response to the ON-manipulation of the cue point register key K1, and the address thus found is stored (registered) into the cue point address storage portion 10a as the cue point address data ADRQ.

The cue point address data ADRQ is stored in correspondence with any of the cue point specifying keys K2, K3, and K4 which are not used currently.

Further, in Step S110, the audio data Dd stored in the first memory region MB1 and the second memory region MB2 in the buffer memory MBF is transferred to the cue point memory MCUE so as to be stored into the first memory region MC1 and the second memory region MC2 in the cue point memory MCUE.

Because three cue point memories MCUEs are provided to correspond to the cue point specifying keys K2, K3, and K4, the audio data Dd is stored into the cue point memory MCUE corresponding to the cue point specifying key to which the aforementioned cue point address data ADRQ is assigned.

By the processing in Step S110, the audio data Dd related to the cue point is stored into the cue point memory MCUE.

Then, the flow proceeds to Step S112, in which whether the beat density data DBPM has been already measured in Step S102 described above is confirmed. To be more specific, when the beat density data DBPM has been supplied to the system controller 9 in Step S102, it is judged that the beat density data DBPM has been already measured, and the flow proceeds to Step S114. When the beat density DBPM is being measured and has not been supplied to the system controller 9 yet, the flow proceeds to Step S116.

When the flow proceeds to Step S114, the system controller 9 stores (registers) the true beat density data DBPM into the beat density storage portion 10b as the beat density data DBPMreg when cue point registration is specified in Step S106. In other words, the beat density data DBPMreg, which will be needed in starting random access playback when the cue point is specified later, is stored (registered) into the beat density storage portion 10b in advance. Then, when the registration of the beat density data DBPMreg is completed, processing from Step S102 is repeated.

On the other hand, when the flow proceeds from Step S112 to Step S116, data indicating that the beat density data DBPM has not been measured yet is stored into the beat density storage portion 10b, after which processing from Step S102 is repeated.

As has been described, when the cue point register key K1 is manipulated to be ON during audio playback, the cue point is registered by storing the cue point address data ADRQ related to the audio data being played back at the ON-manipulation and the cue point specifying key and the beat density data DBPM corresponding to the cue point address data ADRQ into their respective storage portions, while storing the audio data Dd which makes seamless playback possible and is positioned prior to and subsequent to each other in reference to the current playback time point Tc into the cue point memory MCUE.

Next, the following description will describe an operation when the cue point specifying key is manipulated to be ON after the cue point is registered.

Referring to FIG. 6, in Step S200, audio playback is started when a start of the playback operation is specified while the disc DISC is inserted.

It is needless to say that the cue point can be specified only when the disc DISC for which the cue point has been registered is inserted, and the following description will describe an operation when playing the disc DISC for which the cue point has been registered.

When audio playback is started in Step S200, playback is performed at a tempo set by the tempo adjusting unit 12, and further, when the user or the like manipulates the jog dial 13 to rotate, forward playback or reverse playback is performed at a tempo depending on a rotational direction and a rotational speed of the jog dial 13. Also, when the user or the like manipulates the jog dial 13 to be depressed, forward playback is performed at a tempo corresponding to a speed of the depressed manipulation.

In this manner, processing in Steps S202 through S216 described below is performed while audio playback is performed according to manipulations by the user or the like.

In Step S202, the beat density measuring portion 7e finds the beat density (DBPM) at the current playback time point Tc by performing the same processing as in Step S102 described above, and supplies the same to the system controller 9.

Then, in Step S204, judgment processing is performed in the same manner as in Step S104 described above. Thus, when judged that the audio playback should be ended according to a command from the user or the like, the audio playback is terminated. On the other hand, when judged that the audio playback should be continued, the flow proceeds to Step S206.

In Step S206, which of the cue point specifying keys K2, K3, and K4 which have been registered is manipulated to be ON is checked, and when none of the cue point specifying keys K2, K3, and K4 is manipulated to be ON, processing from Step S202 is repeated.

When any of the cue point specifying keys K2, K3, and K4 is manipulated to be ON, the flow proceeds to Step S208.

In Step S208, whether the beat density data DBPM has been already measured in Step S202 is confirmed. That is, the same confirmation processing as in Step S112 described above is performed.

Herein, when the beat density data DBPM has been already measured, the flow proceeds to Step S210; otherwise, the flow proceeds to Step S216.

When the flow proceeds to Step S216, random access playback is started without performing the aforementioned correction processing by the beat density correcting portion 10c and the beat density computing portion 10d, after which the flow returns to Step S202 to continue processing.

When the flow proceeds to Step S210, whether the beat density data DBPMreg corresponding to the cue point specifying key manipulated to be ON has been stored (registered) in the beat density recording portion 10b is confirmed. When the beat density data DBPMreg has not been stored, the flow proceeds to Step S216, in which random access playback is started without performing the aforementioned correction processing by the beat density correcting portion 10c and the beat density computing portion 10d, after which the flow returns to Step S202 to continue processing.

On the other hand, in Step S210, when confirmed that the beat density data DBPMreg has been stored (registered) in the beat density storage portion 10b, the flow proceeds to Step S212, in which the aforementioned correction processing by the beat density correcting portion 10c and the beat density computing portion 10d is started.

In Step S212, processing is started by analyzing the actual beat density of a playback sound at the time point at which the cue point is specified and the beat density of a sound to be played at the instant following the start of the random access playback.

In other words, the beat density computing portion 10d computes the actual beat density ($\alpha \times DBPM$) of a playback sound at the time point at which the cue point is specified, by multiplying the beat density data DBPM (measured when the cue point is specified) with a coefficient value $\alpha$ in proportion to the aforementioned readout address switching speed. Further, the beat density computing portion 10d computes the beat density ($\alpha \times DBPMreg$) of a sound to be played at the instant following the start of the random access playback, by multiplying the registered beat density data DBPMreg with the coefficient value $\alpha$.

Further, the beat density correcting portion 10c checks whether the absolute value of a difference between the beat densities ($\alpha \times DBPM$) and ($\alpha \times DBPMreg$) is greater than a predetermined threshold, thereby judging beforehand whether a tempo of a playback sound changes abruptly or becomes discontinuous when random access playback is started.

When an abrupt change or discontinuity of a tempo of the playback sound is judged, the correction processing is performed, so that a tempo is changed with continuity when a playback sound at the time point at which the cue point is specified changes to a sound to be played after random access playback is started.

Initially, a quantity of correction $\Delta = |\alpha \times DBPM - \alpha \times DBPMreg|/K$ per stage is found by dividing (with a predetermined stage number K) the absolute value $|\alpha \times DBPM - \alpha \times DBPMreg|$ of a difference between the beat densities ($\alpha \times DBPM$) and ($\alpha \times DBPMreg$).

Further, which of the beat densities ($\alpha \times DBPM$) and ($\alpha \times DBPMreg$) has a greater value is checked. In the case of ($\alpha \times DBPM$)<($\alpha \times DBPMreg$), beat density correction values $\Delta_1, \Delta_2, \Delta_3, \ldots$, and $\Delta_k$ for every predetermined time $\tau$ since the instant following the start of random access playback are computed in accordance with Equation (1) below. In the case of ($\alpha \times DBPM$)>($\alpha \times DBPMreg$), beat density correction values $\Delta_1, \Delta_2, \Delta_3, \ldots$, and $\Delta_k$ for every predetermined time $\tau$ (passing from an instant following the start of random access playback) are computed in accordance with Equation (2) below.

In short, when the beat density increases, a computation in accordance with Equation (1) is performed, and when the beat density decreases, a computation in accordance with Equation (2) is performed.

$\Delta_1$ (a correction value from the instant following the start of random access playback to a predetermined time $\tau$)=$\Delta$ $\Delta_2$ (a correction value from the time $\tau$ to a time $2\tau$)=$2 \times \Delta$ $\Delta_3$ (a correction value from the time $2\tau$ to a time $3\tau$)=$3 \times \Delta$ . . .

$\Delta_k$ (a correction value from a time $(K-1)\tau$ to a time $K\tau$)=$K \times \Delta$ [Equation (1)]

$\Delta_1$ (a correction value from the instant following the start of random access playback to a predetermined time $\tau$)=$(K-1) \times \Delta$ $\Delta_2$ (a correction value from the time $\tau$ to a time $2\tau$)=$(K-2) \times \Delta$ $\Delta_3$ (a correction value from the time $2\tau$ to a time $3\tau$)=$(K-3) \times \Delta$ . . .

$\Delta_k$ (a correction value from a time $(K-1)\tau$ to a time $K\tau$)=$\Delta$ [Equation (2)]

Then, the beat density correction values $\Delta_1, \Delta_2, \Delta_3, \ldots$, and $\Delta_k$ found in accordance with Equation (1) or (2) above are converted to the readout address switching speeds $T_1, T_2, T_3, \ldots$, and $T_k$ when reading out the audio data Dcue from the cue point memory MCUE.

To be more specific, given $T_1$ as the readout address switching speed when reading out the audio data Dcue from the cue point memory MCUE from an instant following the start of random access playback to the predetermined time $\tau$, $T_2$ as the readout address switching speed when reading out the audio data Dcue from the cue point memory MCUE from the time $\tau$ to a time $2\tau$, and so forth, then readout address switching speeds are found until a readout address switching speed $T_K$ when reading out the audio data Dcue from the cue point memory MCUE from a time $(K-1)\tau$ to a time $K\tau$ in the last.

When the respective switching speeds $T_1, T_2, T_3, \ldots$, and $T_k$ are found, the flow proceeds to Step S214.

In Step S214, random access playback is started by using the switching speeds $T_1, T_2, T_3, \ldots$, and $T_k$ found as above.

To be more specific, the cue point address data ADRQ is obtained first from the cue point address storage portion 10a, and, by using the cue point address data ADRQ thus obtained, the readout address R(Tc) is set which corresponds to the current playback time point Tc from which is started random access playback using the cue point memory MCUE.

Then, during the first time $\tau$, audio playback is performed by reading out the audio data Dcue by memory access to the cue point memory MCUE at the switching speed $T_1$ found as above, and during the following time $\tau$ to the time $2\tau$, audio playback is performed by reading out the audio data Dcue by memory access to the cue point memory MCUE at the switching speed $T_2$ found as above. Thereafter, audio playback is performed by reading out the audio data Dcue successively in the same manner at the switching speeds $T_3$, $T_4, \ldots$, and $T_k$.

When audio playback (from a time point at which the start of the random access playback is specified to the time $K\tau$) is completed, processing from Step S202 is repeated.

As has been described, the beat density of a playback sound played by random access playback from the cue point is corrected based on a quantity of change $\Delta(=|\alpha \times DBPM - \alpha \times DBPMreg|/K)$ of a difference $|\alpha \times DBPM - \alpha \times DBPMreg|$ between the beat density ($\alpha \times DBPM$) of a playback sound measured at the time point at which the start of random access playback is specified and the beat density ($\alpha \times DBPMreg$) of a playback sound to be played after random access playback is started (over the predetermined time $K\tau$). In this way, it is possible to prevent the beat density (tempo) of a sound (which was being played until the cue point was specified) from changing abruptly, and to prevent the beat density (tempo) of a sound (to be played back after the random access playback is started) from changing abruptly, thereby making it possible to provide a playback sound and sound effects which sound natural.

Figure 7:
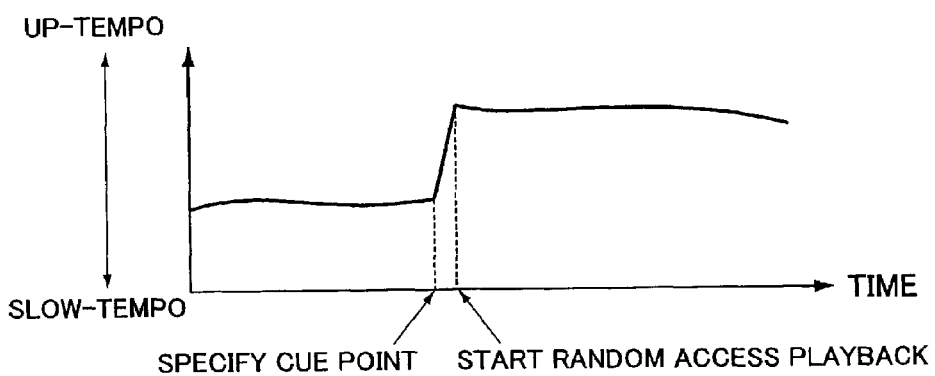
FIGS. 7(a) and 7(b) are views explaining the advantages of correction processing by the information playback apparatus of the present embodiment.
Figure 7:
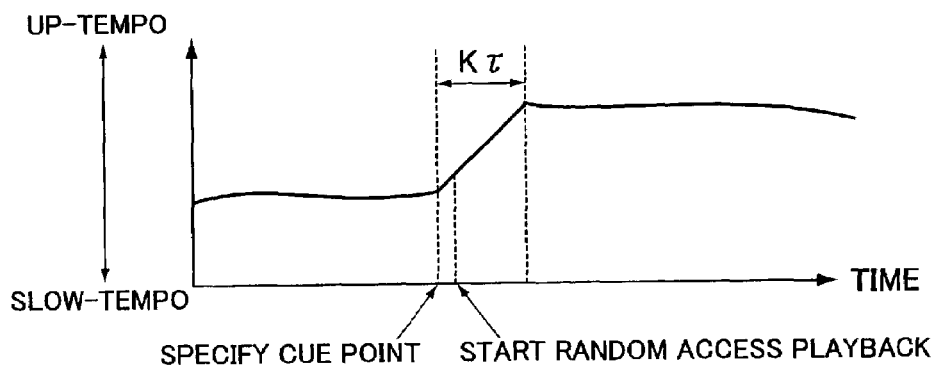
Figure 8:
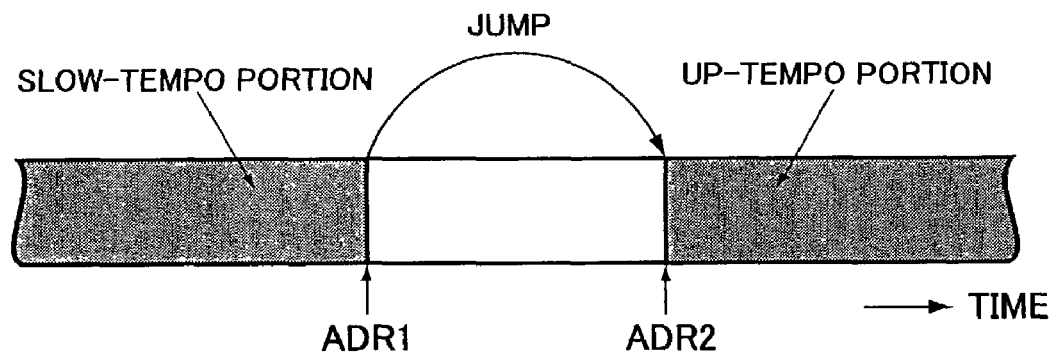
FIGS. 8(a) and 8(b) are views explaining problems caused by conventional random access playback.
Figure 8:
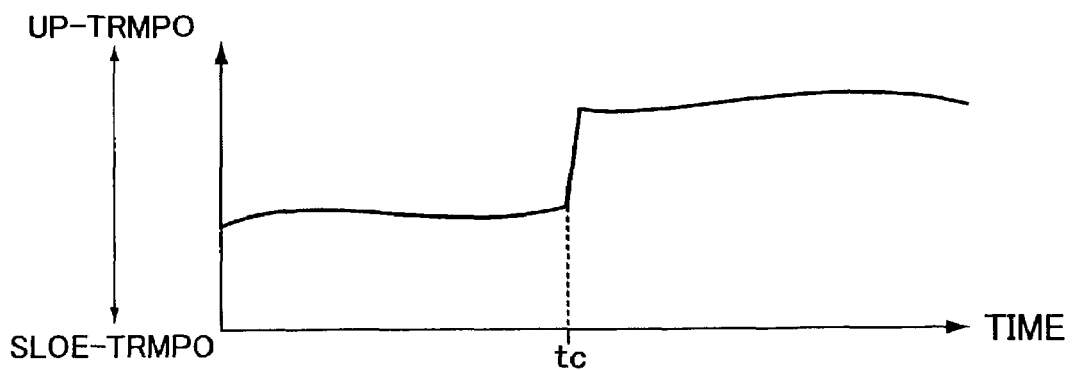

In other words, when random access playback is performed without performing the aforementioned correction processing, as shown in FIG. 7(a) by way of example, in a case where slow-tempo music is switched to up-tempo music, a change rate of the beat density (in other words, a tempo) is too abrupt, and a sound actually played changes a tempo too sudden and thereby sounds unnatural to the user or the like.

On the contrary, when the aforementioned correction processing is performed, as shown in FIG. 7(b) by way of example, during the predetermined period Kτ after the random access playback is started, the speed for memory access to the cue point memory MCUE is changed step by step based on the aforementioned readout address switching speeds $T_1, T_2, T_3, \ldots,$ and $T_k$. Hence, a tempo of an actual sound played by audio playback changes gradually, thereby making it possible to provide a playback sound and sound effects which sound natural.

FIGS. 7(a) and 7(b) show a case when a slow tempo is switched to a fast tempo, but the tempo can be changed gradually also in a reverse case when a fast tempo is switched to a slow tempo. Hence, a problem that a harsh sound is played can be prevented in advance, thereby making it possible to provide a sound which sounds natural.

Further, according to the present embodiment, the past audio data and the future audio data are pre-stored respectively in the first memory region MC1 and the second memory region MC2 of the cue point memory MCUE. Hence, even when forward playback, reverse playback, or shuttle playback is specified to produce sound effects by manipulations of the jog dial 13 or the like immediately after the random access playback is started, it is possible to produce sound effects which sound natural.

According to the embodiment described above, the correction processing is performed in Step S214 of FIG. 6, so that the tempo of a playback sound is changed gradually over the predetermined period Kτ from the time the cue point is specified. In other words, as shown in FIG. 7(b) by way of example, a playback sound and sound effects which sound natural are provided by changing the speed of memory access to the cue point memory MCUE step by step based on the readout address switching speeds $T_1, T_2, T_3, \ldots,$ and $T_k$ with respect to the cue point memory MCUE over the predetermined period Kτ from the time the random access playback is started.

However, as a modification of the present embodiment, a playback sound to be played after the random access playback is started may be corrected in such a manner so as to have a beat density (in other words, a tempo) equal to the beat density (αxDBPM) of a playback sound found when the cue point is specified.

To be more specific, when the user or the like specifies the cue point, in Step S214 of FIG. 6, the beat density computing portion 10d computes the beat density (αxDBPM) of a playback sound being played back when the cue point is specified, and then computes a ratio (αxDBPM)/(DBPMreg) of the beat density data DBPMreg stored (registered) in the beat density storage portion 10b and the beat density (αxDBPM).

Subsequently, the beat density computing portion 10c searches a predetermined database for a tempo in proportion to the ratio (αxDBPM)/(DBPMreg) thus computed, and starts random access playback by supplying the address control portion 7c and the read/write control portion 7d in the signal processing unit 7 with the control signal SPD for playback to be performed at the searched tempo. As a consequence, the audio data Dcue is read out at a readout address switching speed set in proportion to the aforementioned ratio (αxDBPM)/(DBPMreg) with respect to the cue point memory MCUE.

According to this modification, in the event that the beat density (DBPMreg) of a playback sound to be played after the random access playback is started differs from the beat density (αxDBPM) of an actual playback sound when the cue point is specified, the audio data Dcue for random access playback is read out from the cue point memory MCUE at the readout address switching speed in proportion to the aforementioned ratio (αxDBPM)/(DBPMreg), and for this reason, by subjecting the audio data string Dex composed of the audio data Dcue thus read out to digital-to-analog conversion by the digital-to-analog converter in the editing unit 8, it is possible to play a sound continuously at the beat density (in other word, a tempo) equal to the aforementioned beat density (αxDBPM) when the cue point is specified. Hence, it is possible to provide a sound which sounds natural in the case of random access playback.

The above embodiment described the information playback apparatus 1 intended for use with a CD or a DVD. It should be appreciated, however, that an information recording medium capable of recording and playing back information based on the substantially the same principle, for example, an MD, can be also played by the information playback apparatus of the present invention.

As has been described above, according to the information playback apparatus of the present invention, when a start of random access playback is specified, the random access playback is started after the beat density of the information to be played back by random access playback is corrected so as to be equal to the beat density of the information being played back when the start of random access playback is specified. Hence, a playback sound which sounds natural can be played when information, such as music, is played by random access playback.

Also, when the start of random access playback is specified, the random access playback is started by correcting the beat density (according to a predetermined quantity of change) when information being played back at the instruction is switched to information to be played back by random access playback. Hence, a playback sound which sounds natural can be played when information, such as music, is played by random access playback.

While there has been described what are at present considered to be preferred embodiments of the present invention, it will be understood that various modifications may be made thereto, and it is intended that the appended claims cover all such modifications as fall within the true spirit and scope of the invention.

What is claimed is:

1. An information playback apparatus, comprising:
   a playback device for playing back information recorded in an information recording medium;
   a beat density measuring device for measuring a beat density of the information being played back by said playback device;
   a storage device for, in response to an instruction for cue point registration, storing a cue point indicating a start position of random access playback and the beat density of the information in playback which has been measured by said beat density measuring device;
   a cue point specifying device for instructing said playback device to specify a start of the random access playback from the cue point stored in said storage device; and
   a beat density correcting device for controlling said playback device to correct the beat density of the information to be played back from the cue point in the random access playback, wherein when said cue point specifying device specifies the start of the random access playback, said beat density correcting device controls said playback device to start the random access playback by making the beat density of the information, which is to be played back from the cue point by the random access playback, equal to the beat density of the information measured by said beat density measuring device when the start of the random access playback is specified, thereby correcting a discrepancy between the beat density of the information measured by said beat density measuring device when the start of the random access playback is specified and the beat density stored in said storage device.

2. The information playback apparatus according to claim 1, wherein said beat density correcting device finds, as said discrepancy, a ratio of the beat density of the information measured by said beat density measuring device when the start of the random access playback is specified and the beat density stored in said storage device, and controls said playback device to correct the beat density of the information to be played back from the cue point by the random access playback in response to the obtained ratio, so that said playback device starts the random access playback at the beat density corrected to be equal to the beat density of the information measured by said beat density measuring device when the start of the random access playback is specified.

3. An information playback apparatus, comprising:

a playback device for playing back information recorded in an information recording medium;

a beat density measuring device for measuring a beat density of the information being played back by said playback device;

a storage device for, in response to an instruction for cue point registration, storing a cue point indicating a start position of random access playback and the beat density of the information in playback which has been measured by said beat density measuring device;

a cue point specifying device for instructing said playback device to specify a start of the random access playback from the cue point stored in said storage device; and a beat density correcting device for controlling said playback device to correct the beat density of the information to be played back from the cue point in the random access playback, wherein when said cue point specifying device specifies the start of the random access playback, said beat density correcting device finds a difference between the beat density of the information measured by said beat density measuring device when the start of the random access playback is specified and the beat density stored in said storage device, and controls said playback device to start the random access playback by changing the beat density of the information, which is measured by said beat density measuring device when the start of the random access playback is specified, to the beat density of the information to be played back by the random access playback, in response to a quantity of change in said difference over a predetermined time.

* * * * *